Patented Jan. 9, 1940

2,186,632

UNITED STATES PATENT OFFICE 2,186,632

CELLULOSE ORGANIC DERIVATIVE COMPOSITIONS CONTAINING GLYCOL TETRAHYDROFUROATES

Joseph B. Dickey and James B. Normington, Rochester, N. Y., assignors to Eastman Kodak Company, Rochester, N. Y., a corporation of New Jersey No Drawing. Application April 1, 1939, Serial No. 265,550

8 Claims. (Cl. 106—40)

This invention relates to compositions of matter in which cellulose organic derivatives, such as cellulose acetate, cellulose acetate-propionate, cellulose acetate-butyrate, cellulose ethers, and the like, are combined or mixed with a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions, interlayers for laminated glass, and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce compositions of matter which are capable of easy and convenient manipulation in the plastic and analogous arts, such as in the manufacture of sheets, film, artificial silk filaments, varnishes, lacquers and the like, and to produce compositions which will not injure, or be injured by, the substances or surfaces with which they are associated during manufacture. Another object of our invention is to produce compositions which can be molded at elevated temperatures and high pressures to produce plastic products having the desirable properties of hardness, toughness and elasticity. Still another object of our invention is to produce interlayers for laminated glass which retain their properties of toughness and elasticity at low temperatures. Other objects will become apparent to those skilled in the art to which this invention pertains.

We have discovered that valuable properties may be induced in and/or contributed to compositions containing organic derivatives of cellulose, such as cellulose organic acid esters and cellulose ethers, by adding thereto, as a plasticizing compound, a neutral tetrahydrofuroate of a compound of the class consisting of glycols and glycol monoalkyl ethers. These tetrahydrofuroates are claimed in the co-pending application of Joseph B. Dickey and James G. McNally, Serial No. 247,094, filed December 21, 1938. Among these tetrahydrofuroates there may be mentioned, by way of examples, butoxyethyl tetrahydrofuroate, butyl ether of diethylene glycol di-tetrahydrofuroate, ethyl ether of diethylene glycol tetrahydrofuroate, ethylene glycol di-tetrahydrofuroate, triethylene glycol di-tetrahydrofuroate, and trimethylene glycol di-tetrahydrofuroate. The particularly useful properties which they induce in or contribute to cellulosic compositions containing them are hereinafter enumerated.

In order that those skilled in this art may better understand our invention we would state, by way of illustration, that for the manufacture of photographic film base or other sheets our new compositions of matter may be compounded as follows: 100 parts of acetone-soluble cellulose acetate, i. e., cellulose acetate containing from about 36% to 42% acetyl radical, approximately, is dissolved with stirring at atmospheric temperature in 300 to 500 parts, preferably 400 parts, by weight, of acetone. To this solution may be added from 10 to 50 parts by weight of a neutral tetrahydrofuroate of a glycol or glycol ether. Within the limits stated, the amount of plasticizer may be decreased or increased, depending upon whether it is desired to decrease or increase, respectively, the properties which this plasticizer contributes to the finished product. The amount of solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with our invention are very tough and flexible, and maintain flexibility in a superior fashion, even at a temperature of $-10°$ F.

Other volatile solvents which are compatible with the cellulose acetate and our new plasticizers will also occur to those skilled in this art, such as ethylene chloride-alcohol mixtures, ethylene chloride-dioxan mixtures, etc. In like manner these plasticizers may be compounded with other single organic acid esters of cellulose, such as cellulose propionate, butyrate, stearate and the like, or with mixed organic acid esters, such as cellulose acetate-stearate, cellulose acetate-propionate, cellulose acetate-butyrate, cellulose acetate-lactate, cellulose acetate-tartrate and the like, or with cellulose ethers, such for instance, as ethyl cellulose and benzyl cellulose, a suitable solvent which will dissolve both the cellulosic derivative and the plasticizer being employed: for example, an alkylene chloride with or without the addition of an alcohol, or one of the many known volatile solvents for cellulose ethers. For instance, cellulose acetate-propionate and one of our novel tetrahydrofuroate plasticizers may be dissolved in ethylene chloride or in a mixture of propylene chloride and methanol, and sheets of excellent flexibility may be deposited from these solutions. Other substances, such as fire-retardents, evaporation retardents, etc., may be added to the film-forming compositions.

Our novel tetrahydrofuroate plasticizers may also be advantageously used as plasticizers in cellulose organic derivative molding compositions. For instance, from 25 to 150 parts of the plasticizer, depending on the hardness or softness of the plastic desired, may be homogeneously mixed with cellulose acetate, and the mixture converted into a transparent plastic product by molding at a temperature of 140–160° C. and a pressure of 2500 to 4000 pounds per square inch for a period of from 2 to 5 minutes, in a manner well known to those skilled in molding compounds of that nature. The softer plastics may be extruded through a die. Interlayers for laminated glass may be deposited from a solvent or formed by extrusion with or without the use of a volatile solvent.

What we claim as our invention and desire to be secured by Letters Patent of the United States is:

1. A composition of matter comprising a cellulose organic derivative and, as a plasticizer therefor, a neutral tetrahydrofuroate of a compound of the class consisting of glycols and glycol monoalkyl ethers.

2. A transparent, flexible sheet comprising 100 parts by weight of a cellulose organic derivative and, as a plasticizer therefor, from 5 to 150 parts by weight, approximately, of a neutral tetrahydrofuroate of a compound of the class consisting of glycols and glycol monoalkyl ethers.

3. A composition of matter comprising a cellulose organic derivative and butoxyethyl tetrahydrofuroate as a plasticizer therefor.

4. A composition of matter comprising a cellulose organic derivative and the ethyl ether of diethylene glycol tetrahydrofuroate as a plasticizer therefor.

5. A composition of matter comprising a cellulose organic derivative and trimethylene glycol di-tetrahydrofuroate as a plasticizer therefor.

6. A transparent, flexible sheet comprising 100 parts by weight of a cellulose organic derivative and from 5 to 150 parts by weight, approximately, of butoxyethyl tetrahydrofuroate as a plasticizer therefor.

7. A transparent, flexible sheet comprising 100 parts by weight of a cellulose organic derivative and from 5 to 150 parts by weight, approximately, of the ethyl ether of diethylene glycol tetrahydrofuroate as a plasticizer therefor.

8. A transparent, flexible sheet comprising 100 parts by weight of a cellulose organic derivative and from 5 to 150 parts by weight, approximately, of trimethylene glycol di-tetrahydrofuroate as a plasticizer therefor.

JOSEPH B. DICKEY.
JAMES B. NORMINGTON.